3,217,876
ELECTROSTATIC SEPARATION OF MINERALS
Hans Autenrieth, Hannover-Kirchrode, Germany, assignor to Kali-Forschungs-Anstalt G.m.b.H., Hannover, Germany
Filed Oct. 4, 1963, Ser. No. 314,028
Claims priority, application Germany, Jan. 25, 1957, K 30,921; Feb. 9, 1957, K 31,075; Apr. 27, 1957, K 31,785
8 Claims. (Cl. 209—9)

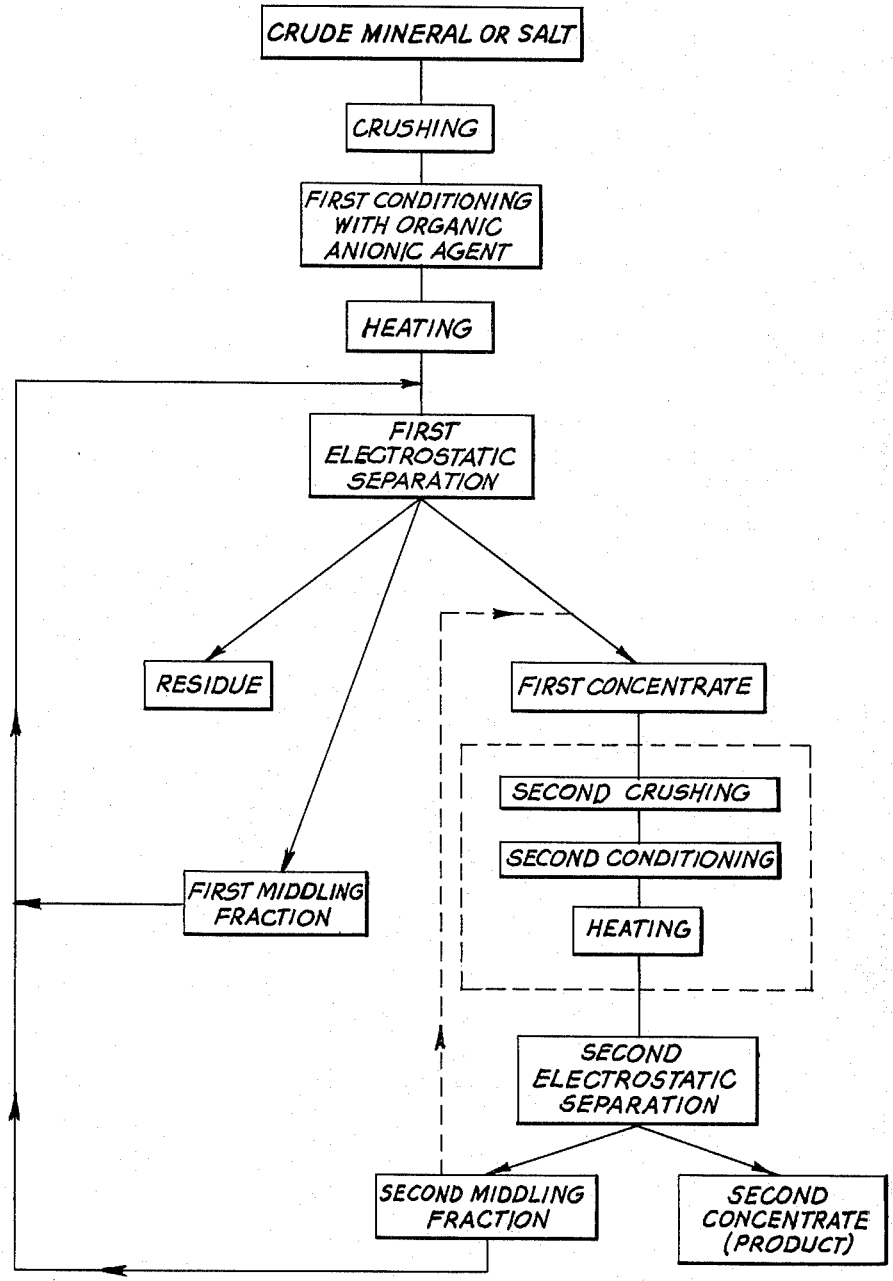

This application is a continuation-in-part of patent application Ser. No. 709,750, now abandoned, filed January 20, 1958, and all rights, priorities and benefits arising thereunder are herein claimed.

The present invention relates to a method for the electrostatic separation of potassium-containing mineral composites into their various components.

The invention relates more particularly to the treatment of minerals, and especially the surface of the minerals, so as to render the same more amenable to electrostatic separation.

Still further, the present invention relates to the conditioning of potassium-containing mineral composites with organic anionic reagents as hereinafter described, and which have the effect of greatly increasing the amenability of the mineral composite particles to electrostatic separation of its components.

Potassium-containing minerals such as sylvinite (which is a mixture of sylvite and halite) or hartsalz (which is a mixture of sylvite, halite and kieserite, $MgSO_4 \cdot H_2O$) give very low yields when treated by conventional electrostatic separation processes, and accordingly such processes have been of little value commercially.

Attempts heretofore have been made to improve the electrostatic separation of mineral components by chemically conditioning the minerals, use being made of certain cationic reagents. This attempt, however, has not proven entirely satisfactory because even under the most favorable conditions of treatment a concentrate containing only about 36% $K_2O$ is obtained. This low yield is unsatisfactory.

It is accordingly a primary object of the present invention to provide an improved method of conditioning the surfaces of potassium-containing mineral composites and the like whereby the same is rendered more amenable to electrostatic separation.

It is still another object of this invention to treat potassium-containing mineral composites with organic anionic conditioning reagents which, when intimately admixed with the mineral composites functions to make them readily responsive to electrostatic separation.

These and other objects and advantages of the present invention will be apparent from a further reading of the specification and of the appended claims.

With the above objects in view, the present invention provides an improved method for the electrostatic separation of potassium-containing mineral composites into their several components, and which comprises the step of mixing subdivided particles of a potassium-containing mineral composite with a small proportion of an organic conditioning reagent, or mixture of reagents, which dissociate into negatively charged organic ions and positively charged H- or metal-ions. In the following description these organic conditioning reagents will generally be designated organic anionic reagents or organic anionic agents. Such organic anionic agents are capable of forming an organic negatively charged radical along with the splitting off of positive ions, as set forth in the claims.

In accordance with the present invention the potassium-containing mineral composite is preferably crushed to a particle size below 10 mesh (ASTM). The resultant particles including dust particles are treated with an organic anionic surface conditioning agent, and thereafter the thus conditioned mineral composite particles are subjected to electrostatic separation in which one or more constituents of the mineral composite are made susceptible to the influence of an electrical field. Thus, due to the preceding surface conditioning with organic anionic agents, the electrostatic separation of the constituents is greatly facilitated.

The present invention is applicable generally to potassium-containing mineral composites and more particularly to all mineral composites containing sylvite and/or carnallite as a constituent. The mineral composites may, for example, consist of crude potassium salts as well as intermediate products of the potassium salt production, such as are to be further enriched, and which may be obtained either by dissolving and crystallizing processes or by froth flotation. Electrostatic separation of such composites as sylvinite (which is sylvite (KCl)+halite (NaCl)) or hartsalz (which is sylvite+halite+kieserite ($MgSO_4 \cdot H_2O$)) or carnallite crude or mixed salts, has been found to be greatly improved by subjecting the minerals to the surface conditioning treatment in accordance with this invention.

The process of the invention is illustrated diagrammatically by the accompanying drawing wherein a flow sheet depicts the manner of sequence of carrying out the process.

The grinding of mineral composite can be carried out for the purposes of the invention by utilizing any grinding means generally adapted to such operations.

In accordance with the process, use may be made of a very small amount of the organic anionic surface conditioning agent. In general, the use of between 0.01 to 0.66 pounds of the organic anionic conditioning agent per ton of the mineral composite gives satisfactory results.

Suitable surface conditioning reagents for the purposes of the present invention comprise organic compounds which exhibit anionic characteristics, e.g. such compounds that are capable of forming an organic negatively charged radical along with the dissociation of positive ions. Mixtures of such surface conditioning reagents also may be used for the purpose of this invention.

The preferred surface conditioning agents are sulfonated hydrocarbon derivatives having the general formula $R(OSO_3X)_n$ or $R(SO_3X)_n$, where R is a hydrocarbon radical, X is hydrogen or metal, and $n$ is a whole number consistent with the chemical nature of R.

Other organic compounds which may be used are those having a hydroxyl group adjacent to a double bond, e.g. naphthols and salts thereof.

Organic carboxylic acids, their derivatives and their salts and mixtures thereof also are very useful conditioning agents. The general formula of such carboxylic compounds is $R—(COOR_1)_n$ where R is a hydrocarbon radical, $R_1$ is hydrogen, a metal or hydrocarbon radical, and $n$ is a whole number.

Among these organic carboxylic acids there are also mixtures of fatty acids (see Tables 1 and 2). Especially mixtures of lower and higher fatty acids and such as contain a plurality of carbon atoms in the molecule, e.g. $C_3$–$C_{10}$, $C_3$–$C_{12}$, $C_7$–$C_{12}$, or $C_{12}$–$C_{18}$, and their salts are very suitable surface conditioning agents.

Such mixtures are advantageous from economical point of view, because they are cheap, and water can be used as a solvent or dispersing agent.

The class of substances that may be utilized in accordance with this invention may contain one or more of the following groups —COOH, —$OSO_3H$, —$SO_3H$, acid OH, active or free H or metals. These are referred to herein as "active groups."

In the operation of the process of this invention, the individual members of the surface conditioning substances may be used either in their pure state or as mixtures of different substances, for example, in the form of technical or commercial grade mixtures as may be available. Likewise, natural or artificial mixtures in which the components contain one or more of said active groups may also be utilized.

The surface conditioning is carried out in accordance with this invention in such manner that the mineral composite is initially crushed or subdivided, then intimately mixed with the conditioning reagents at ordinary room temperature (70° F.). The conditioning reagent suitably is added in the form of a solution or emulsion. Various solvents or dispersion mediums are useful and particularly those which can be easily removed after their addition.

Conventional mixing apparatus and methods may be employed to intimately mix and homogeneously disperse the conditioning reagent throughout the mineral particles being treated.

Before subjecting the resultant conditioned material to electrostatic separation, solvents and dispersion mediums are removed, if such have been used. This may be accomplished by any known and suitable method, e.g. by passing a heated current of air over the material to evaporate the solvent or liquid medium.

The electrostatic charging and separation of mineral components likewise may take place using conventional apparatus. The temperature at which the electrostatic separation is carried out, lies generally between room temperature 70° F. and 220° F., preferably between 100° F. and 140° F. The temperature best suited for electrostatic separation of the mineral components depends somewhat, but not decisively, on the nature of the material to be separated. Removal of the solvent and heating of the resultant material to enhance the electrostatic separation generally can be done in the same apparatus and in a single operation. The preferred temperature range for carrying out the process is given in Tables 1-5, and lies between 100° F. and 140° F.

The electrical potential employed for electrostatic separation depends on the nature and on the composition of the material being treated as well as on the nature and the quantity of the conditioning reagents applied, and generally varies between 7.5 to 22.5 kv./inch (kilovolts per inch). It has been found that to a certain extent smaller amounts of the conditioning reagent may be compensated by employing a higher electrical potential and vice versa.

It is customary and useful to perform the electrostatic separation stepwise. Employing such a working procedure it has been found to be of advantage in some cases, to include between two ensuing electrostatic separation steps an intermediate conditioning treatment of the mineral, and which may be performed in the same manner and with the same or other conditioning reagent as during the first conditioning treatment.

The intermediate conditioning treatment, if desired, may be combined with an additional crushing of the middling fraction. Utilizing this modification of the process, the first crushing does not have to be so complete whereby the production of dust particles is materially reduced.

In carrying out the process of the invention, the mineral composite is first crushed to a degree which will substantially liberate the various mineral constituents from one another. In general, a crushing of the mineral so that the same passes a 10 mesh size sieve is sufficient for this purpose. This can be accomplished by using any suitable disintegrating means.

Thereafter the surface conditioning of the crushed mineral is accomplished by adding about 0.01 to 0.66 lb. of an organic anionic reagent, as described, per ton of the mineral. The crushed mineral and reagent is then intimately mixed by thoroughly agitating and stirring of the mass. The process is preferably carried out at room temperature (70° F.) but this is not critical and somewhat higher temperatures are permitted.

The organic anionic reagent, as heretofore mentioned, may be added as an aqueous solution or aqueous emulsion or suspension. Thereafter the solvent or dispersion medium is removed by heating to boil off or evaporate the same.

Simultaneously with the removal of the solvent or dispersion medium the material being treated is heated to a temperature between room temperature and 220° F., and preferably between 100° F. and 220° F. A temperature range of 100° F. to 175° F. or 100° F. to 140° F. has been found very satisfactory as shown in the examples (see Tables 1-5). For carrying out the treatment of the mineral to effect the electrostatic charge exchange, and subsequent electrostatic separation, the temperature range between about 100° F. to 175° F. is most favorable because within this temperature range a particular phase or film of material develops on the surface of the crushed mineral particles. This phase consists of a monomolecular film composed of water and the organic anionic conditioning reagent, and which is characterized by an especially high electron mobility.

Thereafter the composite material is separated in a conventional electrostatic separator while heated to within the temperature range indicated, and utilizing an electrical differential of 7500 to 22,500 volts per inch.

The electrostatic separation is preferably carried out in several stages with an intermediate conditioning treatment such as shown on the drawing flow sheet. The intermediate conditioning treatment of the material makes use of the same or a different anionic reagent as used in the first or preceding step. Where recrushing of the material of the middling fraction is desired, it is carried out as in the first crushing of the procedure, and such as to reduce the size of the particles to pass a 20 mesh sieve.

The following examples are given to further illustrate the present invention. The scope of the invention, however, is not limited to the specific details of the examples. The percentages given refer to amounts by weight.

In Table 1 the minerals treated consists of a crude sylvinite having a $K_2O$ content of 15%. The electrostatic potential was varied between 7.5 and 22.5 kv. inch. In carrying out the process of the examples, the crushed material was sprayed with an aqueous solution containing 2-5% of the reagents listed in column 2 until the amount of conditioning reagent listed in column 3 was deposited. To remove the solvent, a current of heated air (100° F.) was blown through the mixture while stirring and mixing the same. The material during the process was heated to the temperature listed in column 4. In place of water alcohol such as methanol, ethanol or isopropanol may be used as the solvent.

Thereafter the material was conducted by means of an aluminum vibrating trough to a roll-type separator in which the material was tumbled over three rollers which were electrically grounded. Parallel to the axes of the rollers there were positioned non-ionizing cylindrical electrodes, the distance of the roller surface to the grounded rollers being readily varied as desired. The voltage of the electrodes was also made controllable whereby the same could be varied between 7.5 to 22.5 kv./inch as previously described.

A distance of 1.4 inches between the grounded rollers and the respective electrodes was found to be suitable and thus utilized as shown in the tables. On the other hand, the electrical potential difference between the individual rollers and their respective electrodes varied at different stages of the process and was the lowest at the first roller and the highest at the third roller. The particular values of the potentials used during the treatment are given in the following tables, and the three values given correspond to the first, second and third rollers, respectively. The values for the potential differences of Table 1 are set out in column 5. The potential differences for the second passage of the first concentrate through the electrostatic separation stage remained unchanged.

After the material passed through this first electrostatic

Column 6 of the tables shows the $K_2O$ content of the final product, and column 7 the $K_2O$ yield in relation to the $K_2O$ content of the raw material which is arbitrarily designated as 100%.

*Table 1*

[Sylvite, 12–15% $K_2O$. Separation employing electrical potential of 7,500 to 22,500 v./inch (7.5–22.5K volts per inch)]

| 1 | 2 | 3 | 4 | 5 | 6 | 7 |
|---|---|---|---|---|---|---|
| No. | Surface conditioning reagent used | Amount of reagent added, lb./ton | Temperature, °F. | Potential differences, kv./inch | $K_2O$ content of product, percent $K_2O$ | $K_2O$ yield (content of raw material=100%), percent $K_2O$ |
|  | Without addition of surface conditioning reagent. | -------- | 100 | 12.5/15.0/17.5 | 27.2 | 59.1 |
|  |  | -------- | 120 | 10.0/12.5/15.0 | 34.9 | 70.7 |
|  |  | -------- | 175 | 10.0/12.5/15.0 | 33.8 | 68.5 |
| 1 | Sulfate of oxystearic acid amide | 0.33 | 120 | 10/12.5/15 | 60.6 | 93.0 |
|  |  | 0.33 | 120 | 12.5/15/17.5 | 60.6 | 96.8 |
| 2 | Ricinic acid | 0.22 | 100 | 15/17.5/20 | 53.1 | 90.6 |
| 3 | Glutamic acid | 0.33 | 120 | 17.5/20/22.5 | 52.2 | 91.5 |
| 4 | Mixture of fatty acids, $C_3$–$C_{10}$ | 0.16 | 95 | 12.5/15/17.5 | 59.2 | 94.9 |
|  |  | 0.33 | 140 | 10/12.5/15 | 55.8 | 93.2 |
|  |  | 0.33 | 120 | 10/12.5/15 | 54.0 | 93.0 |
| 5 | Mixture of fatty acids, $C_7$–$C_{12}$ | 0.33 | 140 | 12.5/15/17.5 | 55.6 | 91.5 |
| 6 | Mixture of fatty acids, $C_{12}$–$C_{18}$ | 0.33 | 120 | 12.5/15/17.5 | 53.4 | 94.7 |
| 7 | Linseed oil fatty acids | 0.22 | 140 | 12.5/15/17.5 | 53.3 | 96.5 |
|  |  | 0.22 | 100 | 12.5/15/17.5 | 54.1 | 95.3 |
|  |  | 0.33 | 120 | 10/12.5/15 | 53.0 | 96.5 |
| 8 | Benzoic acid | 0.33 | 120 | 10/12.5/15 | 53.2 | 93.3 |
| 9 | Phenylacetic acid | 0.33 | 120 | 15/17.5/20 | 58.0 | 94.0 |
| 10 | Salicylic acid | 0.33 | 120 | 10/12.5/15 | 51.5 | 92.0 |
| 11 | Phthalic acid | 0.04 | 120 | 12.5/15/17.5 | 53.6 | 90.0 |
|  |  | 0.16 | 120 | 7.5/10/12.5 | 58.4 | 91.5 |
| 12 | Alpha-nitroso-beta-naphthol | 0.33 | 120 | 10/12.5/15 | 60.6 | 93.0 |
| 13 | Beta-naphthol | 0.33 | 120 | 12.5/15/17.5 | 55.8 | 94.0 | separation stage, two fractions were taken off, a first concentrate and a residue. The residue was removed from the process. The first concentrate was then subjected to a further treatment and electrostatic separation which was identical to the first one. Two fractions were formed as a result of this second treatment consisting of a second concentrate and a middling fraction. The second concentrate constitutes the final product, the middling fraction is recycled back through the first electrostatic separation stage as a continuous operation. The second concentrate, of course, may be subjected to a third step and further steps of the electrostatic separation, whereby products of 60% $K_2O$ content are obtained. In the examples, however, these further steps are not used.

In the following Table 2 there is tabulated the results which were obtained by the process of the present invention when treating hartsalz. The hartsalz material was treated in exactly the same manner as described for the examples of Table 1. Further, with respect to the choice of the listed examples and the effectiveness of the conditioning reagents upon the hartsalzes of different origin, everything which was stated with respect to Table 1 apply in like manner to Table 2. Table 2 likewise merely represents an illustrative selection taken from a great number of tests conducted and the results recorded as set forth in the examples of Table 1.

*Table 2*

[Hartsalzes, 10.4–12% $K_2O$. Separation potential, 7,500–22,500 v./inch]

| 1 | 2 | 3 | 4 | 5 | 6 | 7 |
|---|---|---|---|---|---|---|
| No. | Surface conditioning reagent used | Amount of reagent added, lb./ton | Temperature, °F. | Potential differences, kv./inch | $K_2O$ content of product, percent $K_2O$ | $K_2O$ yield (content of raw material=100%), percent $K_2O$ |
|  | Without preceding treatment | -------- | 100 | 17.5/20/22.5 | 18.1 | 33.7 |
|  |  | -------- | 175 | 17.5/20/22.5 | 19.4 | 40.4 |
| 1 | Nonyl sulfate | 0.66 | 100 | 10/12.5/15 | 45.2 | 92.1 |
| 2 | Sodium salt of alkylsulfonic acid ("Mersolat D" Bayer) | 0.46 | 175 | 12.5/15/17.5 | 45.2 | 93.0 |
| 3 | Sodium salt of oxystearic sulfonic acid | 0.40 | 100 | 10/12.5/15 | 57.0 | 94.0 |
|  |  | 0.33 | 100 | 12.5/15/17.5 | 58.2 | 92.1 |
|  |  | 0.44 | 100 | 10/12.5/15 | 58.6 | 93.7 |
| 4 | Sodium salt of benzylnaphthalenesulfonic acid | 0.33 | 120 | 12.5/15/17.5 | 56.0 | 93.0 |
| 5 | Sulfonated amides of fatty acids ("Xynomine" Onyx) | 0.33 | 120 | 12.5/15/17.5 | 60.6 | 96.8 |
| 6 | Sodium salt of oxystearinsulfonic acid ("Prastabitol") + sodium salt of sulfonated ricinic acid 1:1 | 0.33 | 100 | 12.5/15/17.5 | 54.1 | 92.2 |
| 7 | Sodium salt of oxystearinsulfonic acid ("Prastabitol") + sodium salt of alkylsulfonic acid ("Mersolat D") 1:1. | 0.22 | 100 | 15/17.5/20 | 54.8 | 91.5 |
| 8 | Phthalic acid | 0.44 | 120 | 7.5/10/12.5 | 50.2 | 91.3 |
| 9 | Salicylic acid | 0.44 | 120 | 10/12.5/15 | 48.4 | 96.2 |
| 10 | Benzoic acid | 0.44 | 120 | 10/12.5/15 | 56.0 | 90.6 |
| 11 | Mixture of fatty acids, $C_{14}$–$C_{10}$ | 0.33 | 100 | 12.5/15/17.5 | 54.0 | 94.0 |
| 12 | Mixture of fatty acids, $C_{14}$–$C_{22}$ | 0.33 | 140 | 12.5/15/17.5 | 53.4 | 94.7 |
| 13 | Alpha-nitroso-beta-naphthol | 0.44 | 120 | 7.5/10/12.5 | 47.4 | 94.0 |
| 14 | Beta-nitroso-alpha-naphthol | 0.44 | 120 | 10/12.5/15 | 50.0 | 92.8 |

The results produced by the process where the intermediate conditioning treatment is employed is given in the following Table 3. The examples show the results as obtained with and without intermediate conditioning treatments for the purposes of comparison. The experimental conditions were exactly the same as in the examples of Tables 1 and 2 until the first concentrate was obtained. Then before subjecting this first concentrate to the electrostatic separation and comprising the second stage, the material was reconditioned with the admixture therewith of a surface conditioning reagent such as listed in Table 3. The second concentrate as aforementioned represents the final product.

separation process of this invention is essentially a "dry process" which is in contrast to the known "wet processes," e.g. the dissolving and leaching processes, and the froth flotation processes. The process of the invention provides a simple and low cost method. This advantage is gained because the costs of drying and removal of waste brine do not arise in the process of this invention.

In the operation of the present invention the presence of extremely small, dust-size particles, does not lower the efficiency of the process. This is in contrast to all known electrostatic separation processes where dust particles must be removed otherwise the electrostatic separation treatment cannot be satisfactorily carried out.

Table 3

[Sylvite, 14–16% $K_2O$. Separation potential, 7.500–22.500 v./inch. Separation temperature, 120° F.]

| | Conditioning agent | Amount of reagent added, lb./t. | 1. Concentrate $K_2O$ content, percent $K_2O$ | Conditioning agent | Amount of reagent added lb./t. | 2. Concentrate $K_2O$ content, percent $K_2O$ | Potential differences (the same in both stages), kv./inch | $K_2O$ yield, percent $K_2O$ |
|---|---|---|---|---|---|---|---|---|
| 1 | Mixture of fatty acids $C_3$–$C_{10}$. | 0.165 | 37.6 | Pyrocatechol<br>Phthalic acid | 0.10<br>0.01 | 60.0 | 10/12.5/15 | 94.6 |
| 2 | Mixture of fatty acids $C_3$–$C_{10}$. | 0.22 | 40.2 | Phthalic acid<br>Sodium salt of oxystearinsulfonic acid. | 0.055<br>0.055 | 59.7 | 7.5/10/12.5 | 96.2 |
| 3 | Phenylacetic acid | 0.22 | 37.4 | Phenylacetic acid | 0.11 | 60.8 | 12.5/15/17.5 | 95.4 |
| 4 | ....do.... | 0.22 | 39.6 | Salicylic acid | 0.11 | 61.5 | 12.5/15/17.5 | 96.5 |
| 5 | ....do.... | 0.22 | 40.4 | Pyrocatechol<br>Phthalic acid | 0.10<br>0.01 | 60.9 | 10/12.5/15 | 95.4 |

The results shown in Table 3 indicate that by employing the intermediate surface conditioning step in carrying out this process of this invention, the content of $K_2O$ in the final product is increased over that where the intermediate conditioning step is omitted.

Table 4 shows the results obtained when the process is carried out for concentrating $K_2O$ from crude carnallite using a mixture of $C_3$–$C_{10}$ fatty acids as described.

Table 4

Carnallite-crude salt: 52% carnallite, 8.85% $K_2O$
Conditioning: fatty acid mixture $C_3$–$C_{10}$, 0.33 lb./ton
Separation temperature: 140° F.
Separation potential: 12.5/16.25/20 kv./inch

| Product: | Percent |
|---|---|
| Carnallite content | 91.5 |
| $K_2O$ content | 15.5 |
| Yield in $K_2O$ or carnallite | 92.0 |

The following Table 5 shows that the process of the present invention permits the handling and treatment of material containing up to 10% and higher of the finest grain size without reducing the effectiveness and efficiency of the process.

Table 5

[Crude sylvinite, 12% $K_2O$. Conditioning reagents, sodium salt of oxystearinsulfonic acid. Quantity applied, 0.55 lb./ton. Separation temperature, 100° F. Potential differences, 12.5/15/17.5 kv./inch]

| Proportion, minus 140 mesh, percent | $K_2O$ content of product, percent $K_2O$ | Yield, percent $K_2O$ |
|---|---|---|
| 0 | 58.5 | 89.0 |
| 5 | 56.1 | 92.4 |
| 10 | 52.0 | 91.0 |

The process of the present invention makes it possible to employ an electrostatic separating method to obtain potassium concentrates from mineral composites in an economical manner and with good results. The electrostatic The foregoing description and flow sheet is believed to adequately disclose the present invention so that others can by applying current knowledge readily adapt it for various applications without omitting features that, from the standpoint of the prior art, fairly constitute essential characteristics of the generic of specific aspects of this invention, and as set forth in the following claims.

What is claimed is:

1. A method for the electrostatic separation of potassium-salt-containing mineral composites into individual components resulting in a percent by weight $K_2O$-yield of more than 90%, comprising the steps of:
   (a) crushing said mineral composites to a size below 10 mesh;
   (b) mixing said crushed mineral composites including dust particles of said mineral composites with 0.01–0.66 lb. of a surface conditioning reagent per ton of crushed mineral composites, said surface conditioning reagent consisting of organic anionic agents capable of forming an organic negatively charged radical along with the splitting off of positive ions, said organic negatively charged radicals selected from the group consisting of the salts of carboxylic acids, salts of sulfonic acids, organic sulfates, naphthols and mixtures thereof in the form of aqueous solutions and dispersions;
   (c) heating said mixture to a temperature between 100° F. and 140° F.;
   (d) electrostatically separating said mixture at a field gradient of 7500–22,500 volts/inch and a temperature between 100° F. and 175° F. into a $K_2O$-enriched first concentrate fraction, a middling fraction, and a $K_2O$-poor residue;
   (e) removing said $K_2O$-poor residue;
   (f) returning said first middling fraction for recycling through the process; and
   (g) electrostatically separating said first concentrate again thereby obtaining a final concentrate and a second middling fraction which is recycled in continuous operation of the process.

2. A method for the electrostatic separation of potassium-salt-containing mineral composites into individual components resulting in a percent by weight K₂O-yield of more than 90%, comprising the steps of:
(a) crushing said mineral composites to a size below 10 mesh;
(b) mixing said crushed mineral composites including dust particles of said mineral composites with 0.01–0.66 lb. of a surface conditioning reagent per ton of crushed mineral composites, said surface conditioning reagent consisting of organic anionic agents capable of forming an organic negatively charged radical along with the splitting off of positive ions, said organic negatively charged radicals selected from the group consisting of the salts of carboxylic acids, salts of sulfonic acids, organic sulfates, naphthols and mixtures thereof in the form of aqueous solutions and dispersions;
(c) heating said mixture to a temperature between 100° F. and 175° F. and forming monomolecular films on said mineral composites;
(d) electrostatically separating said mixture at a field gradient of 7,500–22,500 volts/inch and a temperature between 100° F. and 175° F. into a K₂O-enriched first concentrate fraction, a middling fraction, and a K₂O-poor residue;
(e) removing said K₂O-poor residue;
(f) returning said first middling fraction for recycling through the process:
(g) crushing said first concentrate fraction;
(h) mixing said first concentrate fraction with 0.01–0.66 lb. of a surface conditioning reagent per ton of said first concentrate fraction, said surface conditioning reagent consisting of organic anionic agents capable of forming an organic negatively charged radical along with the splitting off of positive ions, said organic negatively charged radicals selected from the group consisting of the salts of carboxylic acids, salts of sulfonic acids, organic sulfates, naphthols and mixtures thereof in the form of aqueous solutions and dispersions;
(i) heating the mixture of said first concentrate fraction to a temperature between 100° F. and 175° F.;
(j) electrostatically separating said first concentrate into a final concentrate and a second middling fraction; and
(k) returning said second middling fraction to step (b) for recycling through the process.

3. A method for the electrostatic separation of potassium-salt-containing mineral composites into individual components resulting in a percent by weight K₂O-yield of more then 90%, comprising the steps of:
(a) crushing said mineral composites to a size below 10 mesh;
(b) mixing said crushed mineral composites including dust particles of said mineral composites with 0.01–0.66 lb. of a surface conditioning reagent per ton of crushed mineral composites, said surface conditioning reagent consisting of organic anionic agents capable of forming an organic negatively charged radical along with the splitting off of positive ions, said organic negatively charged radical selected from the group consisting of the salts of carboxylic acids, salts of sulfonic acids, organic sulfates, naphthols and mixtures thereof in the form of aqueous solutions and dispersions;
(c) heating said mixture to a temperature between 100° F. and 220° F.;
(d) electrostatically separating said mixture at a field gradient of 7,500–22,500 volts/inch and a temperature between 100° F. and 175° F. into a K₂O-enriched first concentrate fraction, a middling fraction, and a K₂O-poor residue;
(e) removing said K₂O-poor residue;
(f) returning said first middling fraction for recycling through the process; and
(g) electrostatically separating said first concentrate again thereby obtaining a final concentrate and a second middling fraction which is recycled in continuous operation of the process.

4. A method for the electrostatic separation of potassium-salt-containing mineral composites into individual components resulting in a percent by weight K₂O-yield of more than 90%, comprising the steps of:
(a) crushing said mineral composites to a size below 10 mesh;
(b) mixing said crushed mineral composites including dust particles of said mineral composites with 0.01–0.66 lb. of a surface conditioning reagent per ton of crushed mineral composites, said surface conditioning reagent consisting of organic anionic agents capable of forming an organic negatively charged radical along with the splitting off of positive ions, said organic negatively charged radicals comprising a mixture of the salts of fatty acids containing from 7–14 carbon atoms in the form of aqueous solutions and dispersions;
(c) heating said mixture to a temperature between 100° F. and 220° F.;
(d) electrostatically separating said mixture at a field gradient of 7,500–22,500 volts/inch and a temperature between 100° F. and 175° F. into a K₂O-enriched first concentrate fraction, a middling fraction, and a K₂O-poor residue;
(e) removing said K₂O-poor residue;
(f) returning said first middling fraction for recycling through the process; and
(g) electrostatically separating said first concentrate again thereby obtaining a final concentrate and a second middling fraction which is recycled in continuous operation of the process.

5. A method for the electrostatic separation of potassium-salt-containing mineral composites into individual components resulting in a percent by weight K₂O yield of more than 90%, comprising the steps of:
(a) crushing said mineral composites to a size below 10 mesh;
(b) mixing said crushed mineral composites including dust particles of said mineral composites with 0.01–0.66 lb. of a surface conditioning reagent per ton of crushed mineral composites, said surface conditioning reagent considering of an organic anionic agent capable of forming an organic negatively charged radical along with the splitting off of positive ions, wherein said surface conditioning reagent is a sulfate of oxystearic acid amide in the form of aqueous solutions and dispersions;
(c) heating said mixture to a temperature between 100° F. and 140° F.;
(d) electrostatically separating said mixture at a field gradient of 7500–22,500 volts/inch and a temperature between 100° F. and 175° F. into a K₂O enriched first concentrate fraction, a middling fraction, and a K₂O-poor residue;
(e) removing said K₂O poor residue;
(f) returning said first middling fraction for recycling through the process; and
(g) electrostatically separating said first concentrate again thereby obtaining a final concentrate and a second middling fraction which is recycled in continuous operation of the process.

6. A method for the electrostatic separation of potassium-salt-containing mineral composites into individual components resulting in a percent by weight K₂O yield of more than 90%, comprising the steps of:
(a) crushing said mineral composites to a size below 10 mesh;
(b) mixing said crushed mineral composites including dust particles of said mineral composites with 0.01–0.66 lb. of a surface conditioning reagent per ton of crushed mineral composites, said surface conditioning reagent consisting of an organic anionic agent capable of forming an organic negatively charged radical along with the splitting off of positive ions, wherein said surface conditioning reagent is a salt of benzoic acid in the form of aqueous solutions and dispersions;

(c) heating said mixture to a temperature between 100° F. and 140° F.;

(d) electrostatically separating said mixture at a field gradient of 7500–22,500 volts/inch and a temperature between 100° F. and 175° F. into a $K_2O$ enriched first concentrate fraction, a middling fraction, and a $K_2O$ poor residue;

(e) removing said $K_2O$ poor residue;

(f) returning said first middling fraction for recycling through the process; and (g) electrostatically separating said first concentrate again thereby obtaining a final concentrate and a middling fraction which is recycled in continuous operation of the process.

7. A method for the electrostatic separation of potassium-salt-containing mineral composites into individual components resulting in a percent by weight $K_2O$ yield of more than 90%, comprising the steps of:

(a) crushing said mineral composites to a size below 10 mesh;

(b) mixing said crushed mineral composites including dust particles of said mineral composites with 0.01–0.66 lb. of a surface conditioning reagent per ton of crushed mineral composites, said surface conditioning reagent consisting of an organic anionic agent capable of forming an organic negatively charged radical along with the splitting off of positive ions, wherein said surface conditioning reagent is a salt of phenylacetic acid in the form of aqueous solutions and dispersions;

(c) heating said mixture to a temperature between 100° F. and 140° F.;

(d) electrostatically separating said mixture at a field gradient of 7500–22,500 volts/inch and a temperature between 100° F. and 175° F. into a $K_2O$ enriched first concentrate fraction, a middling fraction, and a $K_2O$ poor residue;

(e) removing said $K_2O$ poor residue;

(f) returning said first middling fraction for recycling through the process; and (g) electrostatically separating said first concentrate again thereby obtaining a final concentrate and a second middling fraction which is recycled in continuous operation of the process.

8. A method for the electrostatic separation of potassium-salt-containing mineral composites into individual components resulting in a percent by weight $K_2O$ yield of more than 90%, comprising the steps of:

(a) crushing said mineral composites to a size below 10 mesh;

(b) mixing said crushed mineral composites including dust particles of said mineral composites with 0.01–0.66 lb. of a surface conditioning reagent per ton of crushed mineral composites, said surface conditioning reagent consisting of an organic anionic agent capable of forming an organic negatively charged radical along with the splitting off of positive ions, wherein said surface conditioning reagent is a salt of phthalic acid in the form of aqueous solutions and dispersions;

(c) heating said mixture to a temperature between 100° F. and 140° F.;

(d) electrostically separating said mixture at a field gradient of 7500–22,500 volts/inch and a temperature between 100° F. and 175° F. into a $K_2O$ enriched first concentrate fraction, a middling fraction, and a $K_2O$ poor residue;

(e) removing said $K_2O$ poor residue;

(f) returning said first middling fraction for recycling through the process; and (g) electrostatically separating said first concentrate again thereby obtaining a final concentrate and a second middling fraction which is recycled in continuous operation of the process.

References Cited by the Examiner

UNITED STATES PATENTS

| | | | |
|---|---|---|---|
| 2,197,865 | 4/1940 | Johnson | 209—127 |
| 2,198,972 | 4/1940 | Peddrich | 209—9 |
| 2,593,431 | 3/1952 | Fraas | 209—9 |
| 2,805,768 | 9/1957 | Lawver | 209—11 |
| 2,805,769 | 9/1957 | Lawver | 209—11 |

OTHER REFERENCES

Taggart: Section 12–125, Handbook of Mineral Dressing, Wiley and Sons, 1945.

HARRY B. THORNTON, *Primary Examiner.*